(12) United States Patent
Lewis et al.

(10) Patent No.: US 7,071,153 B2
(45) Date of Patent: Jul. 4, 2006

(54) METHOD OF ENHANCING A SOILED POROUS SURFACE AND MAINTENANCE THEREOF

(75) Inventors: Paul F. Lewis, Lake Geneva, WI (US); Nathan E. Ludtke, Racine, WI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 10/709,350

(22) Filed: Apr. 29, 2004

(65) Prior Publication Data

US 2005/0245420 A1   Nov. 3, 2005

(51) Int. Cl.
*C11D 3/30* (2006.01)
*C11D 7/06* (2006.01)

(52) U.S. Cl. .......... 510/240; 510/242; 510/251; 510/252; 510/272; 134/26; 134/29

(58) Field of Classification Search .......... 510/240, 510/242, 251, 252, 272; 134/26, 29
See application file for complete search history.

(56) References Cited

U.S. PATENT DOCUMENTS

| | | | |
|---|---|---|---|
| 4,370,174 A | 1/1983 | Braithwaite, Jr. .......... 134/7 |
| 4,469,525 A | 9/1984 | Dodge .......... 134/3 |
| 4,608,086 A | 8/1986 | Dodge .......... 106/12 |
| 4,738,876 A | 4/1988 | George et al. .......... 427/299 |
| 4,749,508 A | 6/1988 | Cockrell, Jr. .......... 252/136 |
| 4,877,459 A | 10/1989 | Cockrell, Jr. .......... 134/40 |
| 5,223,168 A | 6/1993 | Holt .......... 252/142 |
| 5,346,640 A | 9/1994 | Leys .......... 252/162 |
| 5,360,457 A * | 11/1994 | Ruggiero et al. .......... 8/567 |
| 5,490,883 A | 2/1996 | McLaren et al. .......... 134/3 |
| 5,567,247 A | 10/1996 | Hawes et al. .......... 134/36 |
| 5,651,830 A | 7/1997 | Yamaguchi .......... 134/4 |
| 5,656,683 A * | 8/1997 | Ruggiero et al. .......... 524/100 |
| 5,660,891 A | 8/1997 | Kenyon et al. .......... 427/445 |
| 5,691,289 A | 11/1997 | Purcell et al. .......... 510/174 |
| 5,723,424 A * | 3/1998 | Jennings .......... 510/240 |
| 5,725,678 A | 3/1998 | Cannon et al. .......... 134/1 |
| 5,797,986 A | 8/1998 | Rolando et al. .......... 134/6 |
| 5,902,411 A | 5/1999 | Williams et al. .......... 134/3 |
| 5,951,784 A * | 9/1999 | Hawes .......... 134/40 |
| 5,990,067 A * | 11/1999 | Franssen et al. .......... 510/240 |
| 6,071,867 A | 6/2000 | Purcell et al. .......... 510/174 |
| 6,251,194 B1 | 6/2001 | Williams et al. .......... 134/6 |
| 6,358,564 B1 | 3/2002 | Kordosh .......... 427/140 |
| 6,454,632 B1 * | 9/2002 | Jones et al. .......... 451/28 |
| 6,530,384 B1 | 3/2003 | Meyers et al. .......... 134/25.2 |
| 6,585,827 B1 | 7/2003 | Field et al. .......... 134/6 |
| RE38,364 E * | 12/2003 | Wetherell et al. .......... 451/28 |
| 2002/0055448 A1* | 5/2002 | Ruggiero et al. .......... 510/240 |
| 2002/0065355 A1* | 5/2002 | Terase et al. .......... 524/492 |

FOREIGN PATENT DOCUMENTS

CH    546 100    11/1971

* cited by examiner

*Primary Examiner*—Charles Boyer
(74) *Attorney, Agent, or Firm*—Renee J. Rymarz; James J. Sales; Neil E. Hamilton

(57) ABSTRACT

The present invention is directed to a method of enhancing the appearance of a soiled porous surface. The inventive method includes applying a concentrated, alkaline, cleaning composition to the soiled porous surface. This concentrated, alkaline, cleaning composition is then allowed to remain on the surface for a period of time before it is rinsed with water. After drying, a maintainer composition is then applied to the surface. The maintainer composition includes a pore-filling component. The cleaning composition includes an alkaline source and, optionally, a solvent.

20 Claims, 1 Drawing Sheet

METHOD OF ENHANCING A SOILED POROUS SURFACE AND MAINTENANCE THEREOF

BACKGROUND OF INVENTION

1. Field of the Invention

This invention relates generally to a method for enhancing a soiled porous surface and in particular a concrete surface. More particularly it relates to such a method which brightens the concrete surface and maintains the surface appearance.

2. Background

Concrete is a hardened mixture of Portland cement, water, silica sand, coarse aggregate and modifying additives.

Concrete is installed in a plastic state and dries to a hard surface. However, because of the air trapped in the mixture and the various components of concrete, it naturally includes minute air gaps or pores, which result in a less than smooth surface which is porous in nature. Additionally, these pores tend to be jagged edged rather than smooth in nature, resulting in soil being held or embed soil more firmly. Because of this, concrete tends to absorb or hold soils and is difficult to clean. These soils tend to darken the appearance of the concrete surface. Additionally, concrete surfaces become stained and unsightly over time.

For a number of years, concrete has been a popular material for use in floors for warehouses and manufacturing facilities due to its low cost, high durability and lower maintenance demands. However, appearance standards in warehousing applications were not of particular concern because of the function of such facilities. Most of these facilities were only exposed for viewing to the employees, suppliers, etc. of the facility, not the general public. In particular, as long as the floor was clean of debris and not slippery, not much attention was paid to overall brightness and staining of the concrete surface.

Recently, concrete and colored concrete have become more prevalent in retail and other commercial facilities because of its low cost and high durability. Clearly, because of the retail/commercial nature of these facilities, the overall appearance of the flooring surface is of considerable importance to the overall appearance of the retail facility and impression on a consumer.

A concrete floor in a normal retail environment or other facility will become very dark in all high traffic areas, with its pores filling up with debris both from inside the store as well as the parking lot. One can readily see "traffic lanes" or areas on the floor where it is apparent high concentrations of dirt and soils reside. The soils encountered in concrete applications include a combination of residual curing compounds, residual coatings, silica sand, clays, and asphaltic materials. Additionally organic soils from foods sold or sampled in the establishment, motor oils tracked in, dust, carbohydrate, fat, and protein soils from spills, dirt, etc. can be found on such surfaces.

Most methods of cleaning concrete surfaces have focused on a relatively small stained area, of perhaps oil or grease on an outdoor surface, such as a driveway or parking area. In these instances, a dry absorbent material is typically applied to the stain and swept around to absorb the stain, oftentimes with significant mechanical action. The soiled absorbent material is then swept up and disposed of in an appropriate manner. One such material can be found in U.S. Pat. No. 5,990,067. In some such systems, the absorbent material is moistened to activate a detergent material therein. Such material is then removed by sweeping with a broom.

Alternatively, a detergent composition can be applied directly to the stain and rinsed away. An example of such a system can be found in U.S. Pat. No. 5,951,784. All of these systems focus on discrete stains on relatively small areas of a surface.

In those instances where entire concrete surfaces have been addressed, traditional methods of maintaining these floors include cleaning with a neutral or alkaline cleaner or the use of a permanent or semi-permanent sealer or other coating. Unfortunately, typical cleaners do not enhance the brightness, shine or gloss of such surfaces. Additionally, while sealer and other permanent and semipermanent coatings improve overall gloss, over time they need to be removed and replaced at considerable expense.

In summary, a considerable number of deficiencies exist in the art relating to the enhancement, cleaning and maintenance of porous surfaces and in particular concrete. While prior art compositions and methods of treating a concentrated stain on concrete surfaces provide some cleaning, the labor intensive, time consuming, messy compositions and methods and cleanup of such compositions make them less than desirable and time consuming for use on larger surfaces, such as entire floors. Additionally, they provide less than optimum enhancement and cleaning on larger areas. Further, conventional floor cleaners and related methods do not address the unique cleaning requirements of porous surfaces such as concrete. Additionally, improved brightening and gloss is only minimally achieved with such conventional cleaners. Although the use of permanent and semi-permanent coatings provides improved gloss, the initial application expense and difficulty, and added expense in removing and replacing such coatings makes them less than desirable for use on concrete surfaces.

Thus, there is an ongoing search for a method of enhancing and maintaining porous surfaces such as concrete which can be easily used, provide improved enhancement, brightening and gloss while maintaining an acceptable method of application and maintenance to maintain the enhanced appearance. Clearly, there is a need for an improved method of enhancing a soiled porous surface and maintaining the appearance of such surface in an efficient, cost effective manner. In particular, there is a need for an improved method of enhancement and maintenance of porous surfaces, which overcomes the shortcomings of the methods of the prior art.

OBJECTS OF THE INVENTION

It is an object of this invention to provide a method for enhancement and maintenance of porous surfaces, in particular concrete surfaces, which overcomes some of the problems and shortcomings of the prior art. A further object of the invention is to provide an improved method of enhancement and maintenance of concrete surfaces in an efficient manner. Another object of this invention is to provide a method which provides improved brightening of soiled porous surfaces. Another object of this invention provides a method which provides high gloss without the added expense of permanent and semi-permanent coatings. Another object of the invention is to provide a method of routine cleaning and enhancement for such porous surfaces. Still another object of the invention is to provide a method of enhancement and maintenance for such porous surfaces which does not require expensive, labor intensive stripping of a permanent or semipermanent coating while providing high gloss. These and other important objects will be apparent from the following description and from the drawings.

SUMMARY OF INVENTION

The present invention is directed to a method of enhancing the appearance of a soiled porous surface. The inventive method includes applying a concentrated, alkaline, cleaning composition to the soiled porous surface. This concentrated, alkaline, cleaning composition is then allowed to remain on the surface for a period of time before it is rinsed with water. In some embodiments, the cleaning composition can be agitated on the surface prior to rinsing and removal. After drying, a maintainer composition is then applied to the surface. The maintainer composition includes a pore-filling component. Any excess maintainer is then rinsed and removed from the surface. The surface is then allowed to dry. Optionally, it can be polished or buffed by conventional methods to achieve a higher level of gloss. This maintainer composition can then be reapplied to the surface on a periodic basis to keep up the improved appearance as the surface is exposed to foot traffic and becomes resoiled.

The cleaning composition utilized in the method includes an alkaline source and, optionally, a solvent. The alkaline source can be selected from the group consisting of amines, metal oxides, silicates, phosphates and combinations thereof. In one embodiment the alkaline source is a monoethanolamine. In another embodiment, the alkaline source is a metal oxide selected from the group consisting of sodium hydroxide, potassium hydroxide, calcium hydroxide, magnesium hydroxide, lithium hydroxide, and blends thereof. In yet another embodiment, the alkaline source is a silicate selected from the group consisting of sodium silicates, potassium silicates, sodium metasilicates, and combinations thereof. The alkaline source can also alternatively be a phosphate selected from the group consisting of tripotassium phosphate, tetrasodium pyrophosphate, tetrapotassium pyrophosphate, sodium tripolyphosphate, sodium trimetaphosphate, sodium hexametaphosphate, potassium tripolyphosphate and combinations thereof.

Solvents suitable for use in the cleaning composition can included glycol ethers, alcohols, esters, ketones, pyrollidones, dimethyl sulfoxide, ethyl lactate, terpenes, aromatics, chlorinated solvents, aliphatic solvents, dibasic esters, and combinations thereof.

The maintainer composition utilized in the inventive method can include about 0.5–100% pore-filling component, dilution 0.001–1%, about 0.5–90% solvent, and about 0.5–50% surfactant. The pore-filling component is selected from the group consisting of plasticizers, surfactants, soaps, oils, waxes, resins, polymers and combinations thereof. Suitable plasticizers include benzoate esters, diethyl glycol dibenzoate, dipropylene glycol dibenzoate, isodecyl benzoate, dibutyl phthalate, butyl benzyl phthalate, diisoheptyl phthalates, diisodecyl phthalates, diisodecyl phthalates, diiisononyl phthalates, diisotridecyl phthalates, undecyldodecyl phthalates, diisoundecyl phthalates, triaryl phosphate esters, tributoxy ethyl phosphate and combinations thereof.

Oils suitable for use as the pore-filling component are selected from the group consisting of mineral oil, silicone oil, plant oils such as coconut, palm, hemp seed, citrus, pine, or soybean oils, etc., and combinations thereof. The pore-filling component can also be a soap selected from the group consisting of coconut oil soap, tall oil soap, hemp seed oil soap, palm oil soap, olive oil soap, shea butter, sodium tallowate, sodium stearate and combinations thereof. Surfactants can also be used as a pore-filling component in the maintainer composition. Suitable surfactants can include non-ionic surfactants, anionic surfactants, amphoteric, zwitterionic, and cationic surfactants and combinations thereof.

Yet another pore-filling component suitable for use in the maintainer composition is a wax selected from the group consisting of bees wax, polyethylene waxes, polypropylene waxes and combinations thereof.

Further components of the maintainer composition can include solvents, surfactants, preservatives, dyes, secondary wetting agents, chelants, hydrotropes, fragrances, builders, and sequestering agents.

In one embodiment of the inventive method, the method comprises applying a concentrated, alkaline, cleaning composition to the soiled porous surface, said composition including about 0.1–50% of an alkaline source, 0.1–50% of an amine, and 0.1–90% of a solvent, allowing the cleaning composition to remain on the surface for a period of time, then rinsing the surface with water, removal of the excess, allowing it to dry; and applying a maintainer composition to the surface, said maintainer composition including a pore-filling component. In one embodiment, the cleaning composition further includes about 0.01–10% of a wetting agent. The cleaning composition can further include about 0.01–10% of an emulsifier.

In another embodiment of the inventive method, the method comprises applying a concentrated, alkaline, cleaning composition to the soiled porous surface, said composition including about 0.1–20% of an alkaline source, 0.1 30% of an amine, and 0.1–90% of a solvent, allowing the cleaning composition to remain on the surface for a period of time, then rinsing the surface with water, removal of the excess, allowing it to dry; and applying a maintainer composition to the surface, said maintainer composition including a pore-filling component. In one embodiment, the cleaning composition further includes about 0.1–1% of a wetting agent. The cleaning composition can further include about 0.1–5.0% of an emulsifier.

Another embodiment of the inventive method of enhancing the appearance of a soiled porous surface comprises applying a concentrated, alkaline, cleaning composition to the soiled porous surface. The cleaning composition is allowed to remain on the surface for a period of time before the surface is rinsed with water, the water, is optionally removed and the surface is allowed to dry. A maintainer composition is then applied to the surface. The maintainer composition includes a pore-filling component. The thus treated porous surface has a slip coefficient of friction value of at least 0.5 after application of the maintainer composition to the surface.

DETAILED DESCRIPTION

Figure 1:
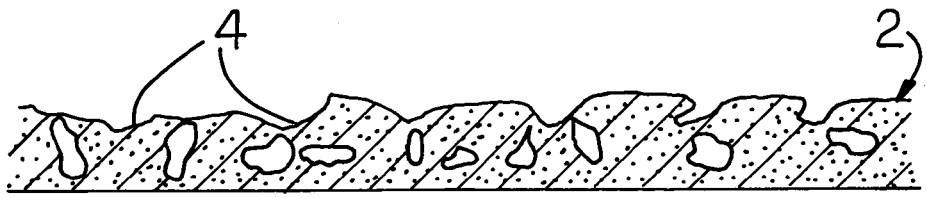
FIG. 1 is a cross-sectional view illustrating a porous surface.
Figure 2:
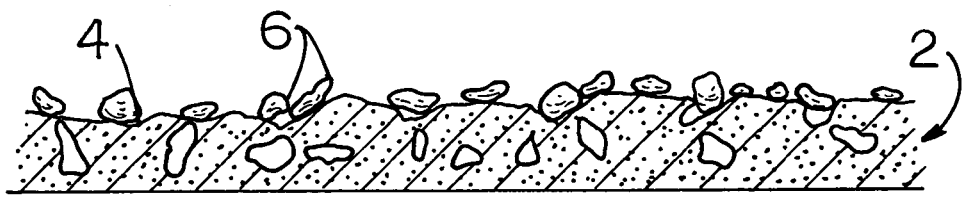
FIG. 2 a cross-sectional view illustrating a soiled porous surface.

The present invention is directed to an improvement in enhancing the appearance of soiled surfaces namely, a method for enhancing the appearance of soiled porous surfaces made of concrete or the like such as floors, walls, etc. As illustrated in FIG. 1, a porous surface 2 includes a number of irregular shaped voids or pores 4. As depicted in FIG. 2, over time dirt and soil particles 6 become embedded in the pores 4 of the porous surface 2. This results in an overall dirty, darkened appearance for such surface 2. This is of particular concern when the surface 2 is a floor or similar surface in a retail establishment, where appearance is an overall concern. The inventive method provides a mechanism whereby such porous surface 2 embedded or coated with soil particles 6 can be cleaned and maintained with minimal effort.

Figure 3:
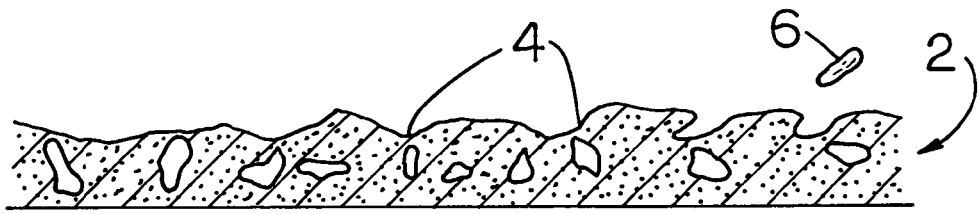
FIG. 3 is a cross-sectional view illustrating a porous surface after application and removal of a cleaning composition.
Figure 4:
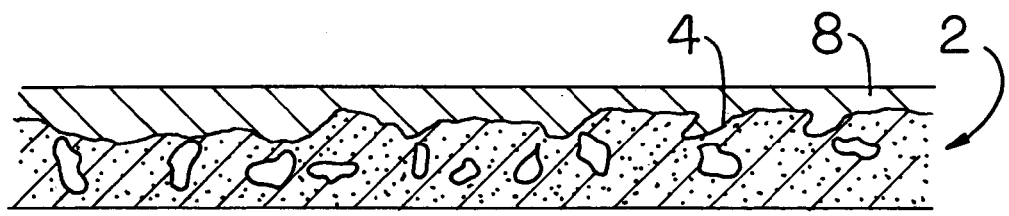
FIG. 4 is a cross-sectional view illustrating a porous surface after application of a maintainer composition.

The inventive method involves applying a concentrated, alkaline, cleaning composition to a soiled porous surface 2 by conventional application techniques, such as flooding of the surface 2 by pouring, application with a mop and bucket, machine application, etc. The cleaning composition is allowed to remain on the surface 2, for a period of time, and rinsing the surface with water. As illustrated in FIG. 3, it is believed that much if not all the heretofore embedded soil particles 6 are removed from the pores 4 during the cleaning and rinsing steps. Thereafter, a maintainer composition is applied to the surface 2 and creates a uniform film 8, as seen in FIG. 4. The maintainer composition preferably includes a pore-filling component which it is believed becomes embedded in or fills the pores 4 as illustrated in FIG. 4. It is believed that the pore-filling component of the maintainer composition prevents soil particles from becoming embedded in the pores 4 thereby resulting in a porous surface remaining clean and easier to routinely clean for longer periods of time. An alternative embodiment of the inventive method further comprises the step of agitating the cleaning composition on the surface prior to rinsing.

The method can further include the step of reapplying the maintainer composition to the surface 2 on a periodic basis. Maintaining the appearance of the floor using the same (or possibly different) maintainer composition during daily or routine cleaning provides for upkeep of the improved appearance of the floor. Typically, after initial treatment, the floor is routinely cleaned using a maintainer composition which removes surface soil from the floor and from the maintainer surface and redeposits some fresh maintainer composition on the surface.

Additional steps can further include polishing or buffing the surface after applying the maintainer composition to achieve higher gloss. This further enhancement of the floor appearance can be accomplished by polishing the floor before or after application of the maintaining composition by utilizing polishing discs or abrasive pads. The combined use of these adds additional shine to the floor as the procedure is repeated over a prolonged period of time. Suitable abrasive pads for polishing, include, but are not limited to pads including silicon carbide, aluminum oxide, feldspar (alkali alumino silicates), tungsten carbide, silicon dioxide, pumice (amorphous aluminum silicate), boron carbide, diamond, boron nitride.

The cleaning compositions utilized in the inventive method include an alkaline source and, optionally, a solvent. The alkaline source can include amines, metal oxides, silicates, phosphates and combinations thereof. One embodiment includes a monoethanolamine as an alkaline source. Suitable monoethanolamines are available from Equistar Chemicals of Houston, Tex., and The Dow Chemical Company of Midland, Mich.

Metal oxides which can be utilized in the cleaning composition include sodium hydroxide, potassium hydroxide and blends thereof. Such metal oxides are available from Occidental Chemicals-Dallas, TX. Silicate selected from the group consisting of sodium silicates, potassium silicates, sodium metasilicates, and combinations thereof can also be used in the cleaning composition. One source for suitable silicates is National Silicates of Toronto, Ontario. The alkaline source can also include a phosphate selected from the group consisting of tripotassium phosphate, tetrasodium pyrophosphate, tetrapotassium pyrophosphate, sodium tripolyphosphate, sodium trimetaphosphate, sodium hexametaphosphate, potassium tripolyphosphate and combinations thereof.

Solvents suitable for use in the cleaning composition can included glycol ethers, such as tri-, di-, and propylene glycol methyl ether and (acetates), tri-, di-, ethylene glycol methyl-, ethyl-, propyl-, butyl-, hexyl-, ether, and (acetates), ethylene glycol phenyl ether, propylene glycol phenyl ether, and mixtures thereof. Additionally, alcohols, such as ethanol, isopropanol, benzyl alcohol, pentanol, n-propanol, 2-ethylhexanol, and combinations thereof can be used as solvents. Further, esters, such as n-butyl acetate, isobutyl acetate, n-propyl acetate, n-butyl, n-propyl, n-pentyl propionate, and combinations thereof can be utilized as solvents. Also, ketones, such as methyl isobutyl ketone, diisobutyl ketone, diacetone alcohol, isophorone and combinations thereof can be utilized. Pyrollidones such as NMP, dimethyl sulfoxide, ethyl lactate, terpenes such as d-limonene, aromatics such as napthalene, xylene, toluene, benzene, chlorinated solvents like methylene chloride, aliphatic solvents such as mineral spirits, propylene carbonates and the like, dibasic esters such as dimethyl succinate, dimethyl adipate, and dimethyl glutarate also are suitable solvents.

The typical cleaning compositions utilized include about 0.1–20% by weight of an alkaline source, about 0.9–30% by weight of an amine and about 0.1–90% by weight of a solvent. Additionally, the cleaning composition can include wetting agents, defoamers, fragrances, chelants, hydrotropes, buffering agents, preservatives, dyes, etc. Suitable cleaning compositions are available from JohnsonDiversey, Inc. under the name PROSTRIP; from Betco Corporation under the name AX-IT PLUS, EXTREME and EXTREME ULTRA; from Proctor & Gamble under the name Proline Floor Finish Stripper; and typical floor strippers available from 3M Corp. The cleaning composition can be diluted prior to application. However, it is preferred that the cleaning composition be utilized in concentrated form.

The maintainer composition used in the inventive method preferably includes a pore-filling component. As previously discussed, it is theorized that such a pore-filling component 8 temporarily fills the gaps or pores 4 in the porous surface 2 thereby preventing soil particles 8 from becoming reembedded or deposited in such pores or gaps 4. Such a situation can best be seen in FIG. 2, which depicts a cross-section of a porous surface 2 wherein soil particles 6 are embedded or deposited in the pores or gaps 4 of the porous surface 2, causing such surface to be soiled, dingy, and dirty in appearance. Typical maintainer compositions suitable for use in the inventive method include about 0.5–100% by weight of a pore-filling component, about 0.5–90% by weight of a solvent and about 0.05–50% by weight of at least one surfactant. Additionally, such maintainer compositions can further include secondary wetting agents, chelants, fragrances, dyes, hydrotropes, builders, sequestering agents, builder, preservatives, etc. Prior to application, such maintainer compositions may be diluted with water. Typical dilution ratios of maintainer compositions to water range from 1:1 to 1:2000. Preferred dilution ratios include 1:100, 1:128, 1:250, 1:256, 1:500, and 1:512.

The pore-filling component is selected from the group consisting of plasticizers, surfactants, soaps, oils, waxes, resins, polymers and combinations thereof. Suitable plasticizers are selected from the group consisting of benzoate esters, diethyl glycol dibenzoate, dipropylene glycol dibenzoate, isodecyl benzoate, dibutyl phthalate, butyl benzyl phthalate, diisoheptyl phthalates, diisodecyl phthalates, diisodecyl phthalates, diiisononyl phthalates, diisotridecyl phthalates, undecyldodecyl phthalates, diisoundecyl phthalates, triaryl phosphate esters, tributoxy ethyl phosphate and combinations thereof.

Oils suitable for use in the pore-filling component include mineral oil, silicone oil, plant oils such as coconut, palm, hemp seed, citrus, pine, or soybean oils, etc., and combinations thereof. The pore-filling component can also include a soap selected from the group consisting of coconut oil soap, tall oil soap, hemp seed oil soap, palm oil soap, olive oil soap, shea butter, sodium tallowate, sodium stearate and combinations thereof. Surfactants, such as non-ionic surfactants, anionic surfactants, amphoteric, zwitterionic, and cationic surfactants, and combinations thereof are also suitable for use in the porefilling component of the maintainer composition. Waxes selected from the group consisting of bees wax, polyethylene waxes, polypropylene waxes and combinations thereof can also be utilized in the pore-filling component.

Maintainer compositions suitable for use include Revive Plus SC available from JohnsonDiversey, Inc.; Green Earth Natural APC and Factory Formula Super HP from Betco Corporation, and 3N1 Floor Cleaner Concentrate from 3M Corp.

After treatment of a surface, in particular a floor surface, by utilization of the inventive method, it is desirable that the porous surface have a slip coefficient of friction value of at least 0.5. Such slip coefficient of friction is measured utilizing ASTM method D 2047, Static Coefficient of Friction as measured by the James Machine.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

EXAMPLES

The following non-limiting examples serve to further illustrate advantages of the disclosed invention.

Example 1

Deep cleaning of a soiled porous concrete floor, which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
|---|---|
| DEIONIZED WATER | 37.42 |
| MONOETHANOLAMINE | 14.0 |
| ETHYLENE GLYCOL MONOBUTYL ETHER | 34.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed with a wet dry vac, and allowed to dry. The resulting floor had a very noticeable, lighter color. After the floor had dried, the maintainer composition was applied. The maintainer composition utilized has the following composition:

Maintainer Composition

| Component | % by Weight |
|---|---|
| DIETHYLENE GLYCOL MONOETHYL ETHER | 17.4 |
| TRIBUTOXYETHYL PHOSPHATE | 10.0 |
| COCAMIDE DEA AND DIETHANOLAMINE | 7.8 |
| TERGITOL 15-S-9 SURFACTANT | 16.0 |
| WATER, DEIONIZED | 47.868 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a significant level of uniform improvement in appearance after treatment.

After the initial treatment, the maintainer dilution was changed to 1:256 for daily maintenance. After 3 weeks of daily application of maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 2

Deep cleaning of a soiled porous concrete floor, which was dark in color and had residual soil which was embedded in the pores of the concrete was accomplished by applying a cleaning composition having the following formula to the floor without dilution by flooding the floor with the cleaning composition by using a mop and bucket.

Cleaning Composition

| Component | % by Weight |
| --- | --- |
| DEIONIZED WATER | 37.42 |
| MONOETHANOLAMINE | 24.0 |
| ETHYLENE GLYCOL MONOBUTYL ETHER | 24.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed, and allowed to dry. The resulting floor had a very noticeable, lighter color. After the floor had dried, the maintainer composition was applied. The maintainer composition utilized has the following composition:

Maintainer Composition

| Component | % by Weight |
| --- | --- |
| DIETHYLENE GLYCOL MONOETHYL ETHER | 17.4 |
| TRIBUTOXYETHYL PHOSPHATE | 2.0 |
| COCAMIDE DEA AND DIETHANOLAMINE | 4.0 |
| TERGITOL 15-S-9 SURFACTANT | 6.0 |
| WATER, DEIONIZED | 69.668 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a significant level of uniform improvement in appearance after treatment.

After the initial treatment, the maintainer dilution was changed to 1:256 for daily maintenance. After 3 weeks of daily application of maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 3

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
| --- | --- |
| DEIONIZED WATER | 27.42 |
| MONOETHANOLAMINE | 24.0 |
| ETHYLENE GLYCOL MONOBUTYL ETHER | 34.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed and allowed to dry. The resulting floor had a very noticeable, lighter color. After the floor had dried, the maintainer composition was applied. The maintainer composition utilized has the following composition:

Maintainer Composition

| Component | % by Weight |
| --- | --- |
| DIETHYLENE GLYCOL MONOETHYL ETHER | 17.4 |
| TRIBUTOXYETHYL PHOSPHATE | 5.2 |
| Coconut Oil Soap | 7.8 |
| TERGITOL 15-S-9 SURFACTANT | 6.0 |
| WATER, DEIONIZED | 62.668 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a significant level of uniform improvement in appearance after treatment.

After the initial treatment the maintainer dilution was changed to 1:256 for daily maintenance. After 3 weeks of daily application of maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 4

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
| --- | --- |
| DEIONIZED WATER | 57.42 |
| MONOETHANOLAMINE | 14.0 |
| ETHYLENE GLYCOL MONOBUTYL ETHER | 14.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed and allowed to dry. The resulting floor had a very noticeable, lighter color. After the floor had dried, the maintainer composition was applied. The maintainer composition utilized has the following composition:

Maintainer Composition

| Component | % by Weight |
| --- | --- |
| DIETHYLENE GLYCOL MONOETHYL ETHER | 0 |
| TRIBUTOXYETHYL PHOSPHATE | 5.2 |
| Coconut Oil Soap | 7.8 |
| TERGITOL 15-S-9 SURFACTANT | 6.0 |
| WATER, DEIONIZED | 87.068 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a low level of uniform improvement in appearance after treatment.

After the initial treatment the maintainer dilution was changed to 1:256 for daily maintenance. After 3 weeks of daily application of maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 5

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
| --- | --- |
| DEIONIZED WATER | 57.42 |
| MONOETHANOLAMINE | 4.0 |
| ETHYLENE GLYCOL MONOBUTYL ETHER | 24.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed and allowed to dry. The resulting floor had a low level of uniform improvement. After the floor had dried, the maintainer composition was applied. The maintainer composition utilized has the following composition:

Maintainer Composition

| Component | % by Weight |
| --- | --- |
| DIETHYLENE GLYCOL MONOETHYL ETHER | 17.4 |
| E-43 Wax Emulsion | 5.2 |
| COCAMIDE DEA AND DIETHANOLAMINE | 7.8 |
| TERGITOL 15-S-9 SURFACTANT | 6.0 |
| WATER, DEIONIZED | 62.668 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a low level of uniform improvement in appearance after treatment.

After the initial treatment the maintainer dilution was changed to 1:256 for daily maintenance. After 3 weeks of daily application of maintainer during heavy pedestrian traffic the floor was seen to have the same color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 6

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
|---|---|
| DEIONIZED WATER | 67.42 |
| MONOETHANOLAMINE | 4.0 |
| ETHYLENE GLYCOL MONOBUTYL ETHER | 14.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed and allowed to dry. The resulting floor had a low level of lighter color. After the floor had dried, the maintainer composition was applied. The maintainer composition utilized has the following composition:

Maintainer Composition

| Component | % by Weight |
|---|---|
| DIETHYLENE GLYCOL MONOETHYL ETHER | 17.4 |
| E-43 Wax Emulsion | 15.0 |
| COCAMIDE DEA AND DIETHANOLAMINE | 7.8 |
| TERGITOL 15-S-9 SURFACTANT | 6.0 |
| WATER, DEIONIZED | 52.868 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a low level of uniform improvement in appearance.

After the initial treatment the maintainer dilution was changed to 1:256 for daily maintenance. After 3 weeks of daily application of maintainer during heavy pedestrian traffic the floor was seen to have the same low level of light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 7

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
|---|---|
| DEIONIZED WATER | 47.42 |
| MONOETHANOLAMINE | 4.0 |
| ETHYLENE GLYCOL MONOBUTYL ETHER | 34.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed and allowed to dry. The resulting floor had a low level of lighter color. After the floor had dried, the maintainer composition was applied. The maintainer composition utilized has the following composition:

Maintainer Composition

| Component | % by Weight |
|---|---|
| DIETHYLENE GLYCOL MONOETHYL ETHER | 17.4 |
| TRIBUTOXYETHYL PHOSPHATE | 10.0 |
| COCAMIDE DEA AND DIETHANOLAMINE | 7.8 |
| TERGITOL 15-S-9 SURFACTANT | 16.0 |
| WATER, DEIONIZED | 47.868 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a low level of uniform improvement in appearance after treatment.

After the initial treatment the maintainer dilution was changed to 1:256 for daily maintenance. After 3 weeks of daily application of maintainer during heavy pedestrian traffic the floor was seen to have the same low level of light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 8

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
|---|---|
| DEIONIZED WATER | 47.42 |
| MONOETHANOLAMINE | 24.0 |
| ETHYLENE GLYCOL MONOBUTYL ETHER | 14.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 4.0 |

This cleaning composition was allowed to soak on the floor for 10 minutes before scrubbing with an autoscrubber type machine. The floor was then rinsed with water, vacuumed and allowed to dry. The resulting floor had a very patchy level of lighter color. After the floor had dried, the maintainer composition was applied. The maintainer composition utilized has the following composition:

Maintainer Composition

| Component | % by Weight |
|---|---|
| DIETHYLENE GLYCOL MONOETHYL ETHER | 17.4 |
| TRIBUTOXYETHYL PHOSPHATE | 2.0 |
| COCAMIDE DEA AND DIETHANOLAMINE | 4.0 |
| TERGITOL 15-S-9 SURFACTANT | 6.0 |
| WATER, DEIONIZED | 69.668 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited very patchy color improvement in appearance after treatment.

After the initial treatment the maintainer dilution was changed to 1:256 for daily maintenance. After 3 weeks of daily application of maintainer during heavy pedestrian traffic the floor was seen to have the same very patchy light color as after the initial cleaning. It also had a slight sheen and looked uniformly patchy. For comparison, an adjacent floor area which had been cleaned with the cleaning composition, but had not seen any maintainer application was as soiled and as dark as prior to cleaning after the same 3 week period.

Example 9

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
|---|---|
| DEIONIZED WATER | 57.42 |
| MONOETHANOLAMINE | 14.0 |
| ETHYLENE GLYCOL MONOBUTYL ETHER | 14.0 |
| BENZYL ALCOHOL TECHNICAL GRADE | 4.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 0 |

This cleaning composition was allowed to soak on the floor for 10 minutes before scrubbing with an autoscrubber type machine. The floor was then rinsed with water, vacuumed and allowed to dry. The resulting floor had a very noticeable, lighter color. After the floor had dried, the maintainer composition was applied. The maintainer composition utilized has the following composition:

Maintainer Composition

| Component | % by Weight |
|---|---|
| DIETHYLENE GLYCOL MONOETHYL ETHER | 17.4 |
| TRIBUTOXYETHYL PHOSPHATE | 5.2 |
| Coconut Oil Soap | 7.8 |
| TERGITOL 15-S-9 SURFACTANT | 6.0 |
| WATER, DEIONIZED | 62.668 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a significant level of uniform improvement in appearance after treatment.

After the initial treatment the maintainer dilution was changed to 1:256 for daily maintenance. After 3 weeks of daily application of maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 10

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

17
Cleaning Composition

| Component | % by Weight |
| --- | --- |
| DEIONIZED WATER | 53.42 |
| MONOETHANOLAMINE | 14.0 |
| ETHYLENE GLYCOL MONOBUTYL ETHER | 14.0 |
| BENZYL ALCOHOL TECHNICAL GRADE | 8.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 0 |

This cleaning composition was allowed to soak on the floor for 10 minutes before scrubbing with an autoscrubber type machine. The floor was then rinsed with water, vacuumed with a wet/dry vac and allowed to dry. The resulting floor had a very noticeable, lighter color. After the floor had dried, the maintainer composition was applied. The maintainer composition utilized has the following composition:

Maintainer Composition

| Component | % by Weight |
| --- | --- |
| DIETHYLENE GLYCOL MONOETHYL ETHER | 0 |
| TRIBUTOXYETHYL PHOSPHATE | 5.2 |
| Coconut Oil Soap | 7.8 |
| TERGITOL 15-S-9 SURFACTANT | 6.0 |
| WATER, DEIONIZED | 87.068 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a significant level of uniform improvement in appearance after treatment.

After the initial treatment the maintainer dilution was changed to 1:256 for daily maintenance. After 3 weeks of daily application of maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 11

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

18
Cleaning Composition

| Component | % by Weight |
| --- | --- |
| DEIONIZED WATER | 39.42 |
| MONOETHANOLAMINE | 14.0 |
| ETHYLENE GLYCOL MONOBUTYL ETHER | 24.0 |
| BENZYL ALCOHOL TECHNICAL GRADE | 12.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 0 |

This cleaning composition was allowed to soak on the floor for 10 minutes before scrubbing with an autoscrubber type machine. The floor was then rinsed with water, vacuumed with a wet/dry vac and allowed to dry. The resulting floor had a very noticeable, lighter color. After the floor had dried, the maintainer composition was applied. The maintainer composition utilized has the following composition:

Maintainer Composition

| Component | % by Weight |
| --- | --- |
| DIETHYLENE GLYCOL MONOETHYL ETHER | 17.4 |
| E-43 Wax Emulsion | 5.2 |
| COCAMIDE DEA AND DIETHANOLAMINE | 7.8 |
| TERGITOL 15-S-9 SURFACTANT | 6.0 |
| WATER, DEIONIZED | 62.668 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited a significant level of uniform improvement in appearance.

After the initial treatment the maintainer dilution was changed to 1:256 for daily maintenance. After 3 weeks of daily application ofr maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Example 12

Deep cleaning of a soiled porous concrete floor which was dark in color and had residual soil which was embedded in the pores of the concrete, was accomplished by applying a cleaning composition having the following formula to the floor without dilution by flooding the floor with the cleaning composition by using a mop and bucket.

Cleaning Composition

| Component | % by Weight |
| --- | --- |
| DEIONIZED WATER | 16.42 |
| MONOETHANOLAMINE | 14.0 |
| ETHYLENE GLYCOL MONOBUTYL ETHER | 34.0 |
| BENZYL ALCOHOL TECHNICAL GRADE | 25.0 |
| SODIUM XYLENE SULFONATE, 40% | 4.0 |
| TETRASODIUM SALT OF EDTA, 40% | 1.2 |
| NaOH 50% | 4.5 |
| Zonyl FSJ | 0.08 |
| Antara LP-700 | 0.8 |
| Ethylene Glycol Phenyl Ether | 0 |

This cleaning composition was allowed to soak on the floor for 10 minutes before scrubbing with an autoscrubber type machine. The floor was then rinsed with water, vacuumed with a wet/dry vac and allowed to dry. The resulting floor had a very noticeable, lighter color. After the floor had dried, the maintainer composition was applied. The maintainer composition utilized has the following composition:

Maintainer Composition

| Component | % by Weight |
| --- | --- |
| DIETHYLENE GLYCOL MONOETHYL ETHER | 17.4 |
| E-43 Wax Emulsion | 15.0 |
| COCAMIDE DEA AND DIETHANOLAMINE | 7.8 |
| TERGITOL 15-S-9 SURFACTANT | 6.0 |
| WATER, DEIONIZED | 52.868 |
| TETRASODIUM SALT OF EDTA, 40% | 0.8 |
| BBA 884679 FRAGRANCE | 0.12 |
| ACID RED 388 LIQUID | 0.012 |

Prior to application, the maintainer composition was diluted with water in the tank of a scrubbing machine in the dilution ratio of 1:128. The diluted maintainer composition was then applied to the floor using the autoscrubbing machine and allowed to soak for 10 minutes. A conventional wet-vacuum attached to the scrubbing machine was used to remove excess maintainer composition from the floor without rinsing. The floor exhibited significant level of uniform improvement in appearance.

After the initial treatment the maintainer dilution was changed to 1:256 for daily maintenance. After 3 weeks of daily application of maintainer during heavy pedestrian traffic the floor was seen to have the same light color as after the initial cleaning. It also had a slight sheen and looked uniform. For comparison, an adjacent floor area which had been cleaned with the cleaning composition, but had not seen any maintainer application was as soiled and as dark as prior to cleaning after the same 3 week period.

Maintaining the appearance of the floor using the same (or possibly different) maintainer composition during daily or routine cleaning provides for upkeep of the improved appearance of the floor. Typically, after initial treatment, the floor is routinely cleaned using a maintainer composition which removes surface soil from the floor and from the maintainer surface and redeposits some fresh maintainer composition on the surface.

This further enhancement of the floor appearance can be accomplished by polishing the floor before or after application of the maintaining composition by utilizing polishing discs or abrasive pads. The combined use of these pads adds additional shine to the floor as the procedure is repeated over a prolonged period of time. Suitable abrasive pads for polishing, include, but are not limited to pads including silicon carbide, aluminum oxide, feldspar (alkali alumino silicates), tungsten carbide, silicon dioxide, pumice (amorphous aluminum silicate), boron carbide, diamond, boron nitride.

These embodiments represent a few possibilities for the inventive method of enhancing a soiled, porous surface and the cleaning compositions and maintainer compositions utilized in the method of the present invention. While the principles of this invention have been described in connection with specific embodiments, it should be understood clearly that these descriptions are made only by a way of example and are not intended to limit the scope of the invention.

The invention claimed is:

1. A method of enhancing the appearance of a soiled concrete surface including pores comprising:
    applying a concentrated, alkaline, cleaning composition to the soiled concrete surface;
    allowing the cleaning composition to remain on the surface for a period of time;
    rinsing the surface with water;
    applying a maintainer composition to the surface, said maintainer composition including a pore-filling component, said pore filling component selected from the group consisting of plasticizers, oils and combinations thereof, said maintainer composition being diluted with water at a dilution ratio of 1:100 to 1:512 maintainer composition to water prior to applying said maintainer composition to the surface;
    allowing the maintainer composition to remain on the surface for a period of time; and
    removing that portion of the maintainer composition not filling in the pores from the surface.

2. The method of claim 1 further comprising reapplying the maintainer composition to the surface on a periodic basis to remove soil from the surface.

3. The method of claim 1 wherein the cleaning composition includes an alkaline source and a solvent.

4. The method of claim 1 wherein the alkaline source is selected from the group consisting of amines, metal oxides, silicates, phosphates and combinations thereof.

5. The method of claim 4 wherein the alkaline source is a monoethanolamine.

6. The method of claim 4 wherein the alkaline source is a metal oxide selected from the group consisting of sodium hydroxide, potassium hydroxide, calcium hydroxide, magnesium hydroxide, lithium hydroxide, and blends thereof.

7. The method of claim 4 wherein the alkaline source is a silicate selected from the group consisting of sodium silicates, potassium silicates, sodium metasilicates, and combinations thereof.

8. The method of claim 4 wherein the alkaline source is a phosphate selected from the group consisting of tripotassium phosphate, tetrasodium pyrophosphate, tetrapotassium pyrophosphate, sodium tripolyphosphate, sodium trimetaphosphate, sodium hexametaphosphate, potassium tripolyphosphate and combinations thereof.

9. The method of claim 1 further comprising the step of agitating the cleaning composition on the surface prior to rinsing.

10. The method of claim 1 further comprising the steps of polishing the surface after removing the portion of the maintainer composition not filling the pores.

11. The method of claim 1 further comprising the steps of polishing the surface before applying the maintainer composition.

12. The method of claim 1 wherein the pore-filling component is a plasticizer selected from the group consisting of benzoate esters, diethyl glycol dibenzoate, dipropylene glycol dibenzoate, isodecyl benzoate, dibutyl phthalate, butyl benzyl phthalate, diisoheptyl phthalates, diisodecyl phthalates, diisodecyl phthalates, diiisononyl phthalates, diisotridecyl phthalates, undecyldodecyl phthalates, diisoundecyl phthalates, triaryl phosphate esters, tributoxy ethyl phosphate and combinations thereof.

13. The method of claim 1 wherein the pore-filling component is an oil selected from the group consisting of mineral oil, silicone oil, plant oils such as coconut, palm, hemp seed, citrus, pine, or soybean oils and combinations thereof.

14. A method of enhancing the appearance of a soiled concrete surface including pores comprising:
applying a concentrated, alkaline, solvent containing, cleaning composition to the soiled concrete surface, said composition including about 0.1–50% of an alkaline source, 0.1–50% of an amine, and 0.1–90% of a solvent; wherein the amine is different from the alkaline source;
allowing the cleaning composition to remain on the surface for a period of time;
rinsing the surface with water;
applying a maintainer composition to the surface, said maintainer composition including a pore-filling component, said pore filling component selected from the group consisting of plasticizers, oils and combinations thereof, said maintainer composition being diluted with water at a dilution ratio of 1:100 to 1:512 maintainer composition to water prior to applying said maintainer composition to the surface;
allowing the maintainer composition to remain on the surface for a period of time; and
removing that portion of the maintainer composition not filling in the pores from the surface.

15. The method of claim 14 wherein the cleaning composition further includes about 0.01–10.0% of a wetting agent.

16. The method of claim 14 wherein the cleaning composition further includes about 0.01–10.0% of an emulsifier.

17. The method of claim 14 wherein the maintainer composition further includes at least one additional component selected from the group consisting of chelants, fragrances, dyes, hydrotropes, builders and sequestering agents.

18. The method of claim 14 wherein the cleaning composition includes about 0.1–20.% of an alkaline source, 0.1–30.0% of an amine, and 0.1–90.0% of a solvent wherein the amine is different from the alkaline source.

19. The method of claim 18 wherein the cleaning composition further includes about 0.01–10.0% of a wetting agent.

20. The method of claim 18 wherein the cleaning composition further includes about 0.01–10.0% of an emulsifier.

* * * * *